United States Patent [19]

Mikuniya

[11] Patent Number: 4,583,782

[45] Date of Patent: Apr. 22, 1986

[54] MOUNTING STRUCTURE OF A SEAT FOR VEHICLES

[75] Inventor: Kunio Mikuniya, Akishima, Japan

[73] Assignee: Tachikawa Spring Co., Ltd., Tokyo, Japan

[21] Appl. No.: 647,027

[22] Filed: Sep. 4, 1984

[51] Int. Cl.[4] ............................ A47C 7/00; B60N 1/00
[52] U.S. Cl. ................................ 297/440; 248/503.1; 296/63; 297/452
[58] Field of Search ............ 297/440, 452, 92, 93, 297/105, DIG. 1, DIG. 2; 296/63, 64; 248/503.1, 503, 509

[56] References Cited

U.S. PATENT DOCUMENTS

| | | | |
|---|---|---|---|
| 2,789,621 | 4/1957 | Langtry et al. | 296/63 |
| 3,411,820 | 11/1968 | Brett et al. | 296/63 |
| 3,915,493 | 10/1975 | Brown | 296/63 |
| 3,924,892 | 12/1975 | Geier | 297/452 X |
| 4,025,114 | 5/1977 | Cave | 297/452 |

FOREIGN PATENT DOCUMENTS 592430 10/1977 Switzerland ................ 297/452

*Primary Examiner*—William E. Lyddane
*Assistant Examiner*—Mark W. Binder
*Attorney, Agent, or Firm*—Hoffman, Dilworth, Barrese & Baron

[57] ABSTRACT

A mounting structure of a seat for vehicles comprising a standing holder secured to a car floor, a latch member secured to the base of a seat providing with a stopper in the shape of a hook for inserting said holder thereinto and a cushioning material laid onto a car floor for giving elasticity to said latch member upward.

3 Claims, 5 Drawing Figures

MOUNTING STRUCTURE OF A SEAT FOR VEHICLES

FIELD OF THE INVENTION

The present invention relates to the improvement of a mounting structure for mounting a seat for vehicles such as an automobile etc to a car body.

BACKGROUND OF THE INVENTION

As conventional structure enabling to mount and disassemble same without employing a machine tool, it is publicly known to utilize the engagement of a latch member in the shape of a plate secured to a seat with a holder secured onto a car floor.

However, it may be noted that since such conventional mounting structure as above has such defect that a latching state of the latch member and the holder is apt to be released owing to the movement of loads on vehicles when a vehicle suddenly stops or starts, it was necessary to mount a number of fittings such as a latch member, holder etc onto a car floor.

SUMMARY OF THE INVENTION

The present invention has been achieved under consideration of the above-mentioned defect and an object of the present invention is to provide a mounting structure for mounting a seat for vehicles to a car with ease without the necessity of mounting a number of fittings onto a seat or a car body.

The above-mentioned object can be achieved by a mounting structure of seat for vehicles which comprises a standing holder secured onto a car floor, a latch member secured to the base of a seat for inserting said holder thereinto and a cushioning material laid on the car floor for giving elasticity to said latch member upward, said holder being consisted of a main body folded in the shape of an angle in the direction of a car width, an inserting portion notched in the horizontal direction at a lower end at one side of the back and force directions of a seat and a latch portion notched upward from the front end of said inserting portion and said latch member consists of the inserting hole for inserting the holder and a stopper in the shape of a hook formed along one edge of said inserting hole which engages the inserting portion of said holder with the latching portion thereof.

BRIEF DESCRIPTION OF THE DRAWINGS

In the Figures,

FIG. 2 is a side view thereof.

FIG. 3 is a perspective view thereof.

FIG. 4 is a plane view of a latch member, and

FIG. 5 is an enlarged longitudinal sectional side view of a main portion of the mounting structure.

DESCRIPTION OF THE PREFERRED EMBODIMENTS

Figure 1:
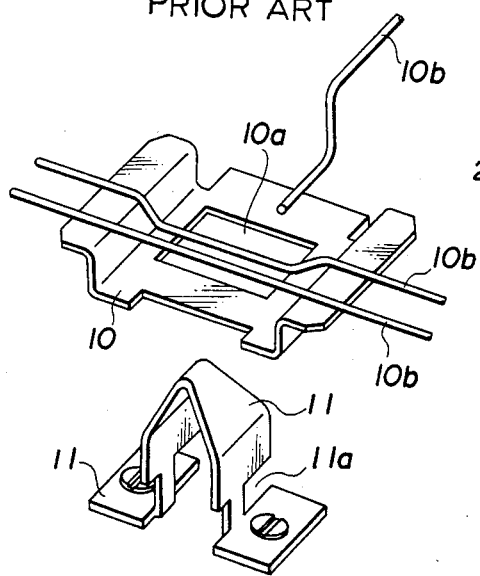
FIG. 1 is a perspective view of a conventional mounting structure of a conventional seat for vehicles.
Figure 3:
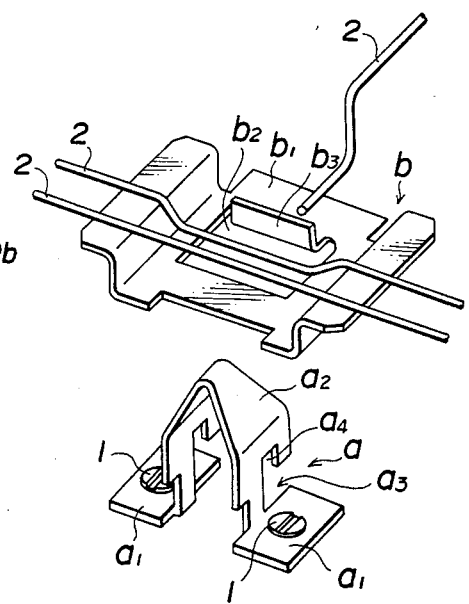
Figure 4:
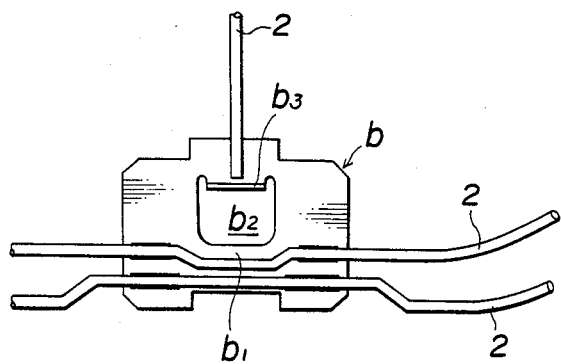

First of all, in order to understand the present invention, a conventional mounting structure will be described with reference to FIG. 1.

A conventional mounting structure was constructed in such a manner that a latch member (10) in the shape of a plate secured to a seat was inserted into a groove (11a) of a holder secured onto a car floor in the horizontal direction so as to engage therewith. (FIG. (X) (Y)). In the Figure, (10a) is an inserting hole formed on the latch member (10) for inserting the holder thereinto and (10b) (10B) (10b) are a seat frame for securing the latch member (10).

According to such conventional structure as above, when a vehicle suddenly stops or starts, the engagement of the latch member (10) with the holder (11) is apt to be released owing to the movement of loads on a seat so that a seat has a fear of being taken out of a car body. For this reason, a number of latch members, holders etc were accordingly necessary to mount same onto a seat and a car floor according to a conventional mounting structure.

Next, one embodiment of the mounting structure according to the present invention will be described with reference to FIG. 2 to FIG. 5.

In the Figures, (a) is a standing holder secured onto a car floor positioned at the base of the front portion of a seat for inserting the holder (a). (c) is a cushioning material laid on a car floor X for giving elasticity to the latch member upward. Said seat is composed of seat frames (2) (2) ... made of a wire rod, a foaming material and a top member materal covering the above frames and foaming material.

Said holder (a) is made of a metallic or synthetic resin plate with a prescribed rigidity and is composed of securing portions ($a_1$) ($a_1$) in the shape of a wing for sucuring same onto the car floor X by means of screws (1) (1) and a main body ($a_2$) in the shape of an angle integrally formed with said securing portions. Said main body ($a_2$) is formed by folding into the shape of an angle in the direction of a car width and an inserting portion ($a_3$) notched in the horizontal shape and a latching portion ($a_4$) notched upward in the rectangular shape from the front end of said inserting portion ($a_3$) of the main body ($a_2$) are respectively formed at a lower end portion of the back side of the seat Y.

Furthermore, on the car floor X where the standing holder (a) is secured, a cushioning material (c), for example, an insulation or a silencer with elasticity such as unweaven cloth, a foamed sheet is laid.

The latch member (b) is made of a metallic plate welded to the seat frames (2) (2) (2) of the seat Y. (FIG. 4) and a concave portion ($b_1$) is formed in the center thereof so as to form a hollow portion for inserting the holder at an upper portioon of the latch member (b).

Figure 5:
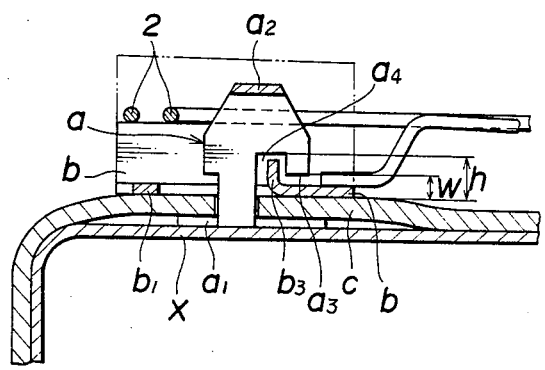

Furthermore, an inserting hole ($b_2$) with a diameter substantially larger than a plane configulation of the holder (a) is formed in said concave portion ($b_1$). A stopper ($b_3$) in the shape of a hook formed by folding the front end thereof upward is also formed at the edge of the back side of the seat Y of said inserting hole ($b_2$). The height (h) of the folded front end of the stopper ($b_3$) is formed higher than the space (w) of the inserting portion ($a_3$) of the holder (a). (FIG. 5).

Thus, in order to mount the seat Y onto the car floor X, the stopper ($b_3$) is inserted into the inserting portion ($a_3$) of the holder (a) so as to secure same to the front portion of the seat Y by engaging with the latching portion ($a_4$), while pushing down the seat Y against the elastic force of the cushioning materal (c) after the holder (a) of the car floor X has been inserted into the latch member (b) mounted at the base of the seat Y.

Regarding with the seat Y thus secured onto the car floor X the stopper ($b_3$) does not take off out of the latchting portion ($a_4$) of the holder (a) because the cushioning material (c) always pushes the stopper (b₃) of the latch member (b) upward. Furthermore, the seat frames (2) (2) as shown in the Figures are formed by folding a wire rod and accordingly they may push the seat Y downward. When the seat frame are secured onto the car floor X they act the elasticity in the up and down directions soo that the stopper (b₃) does not take off therefrom.

Figure 2:
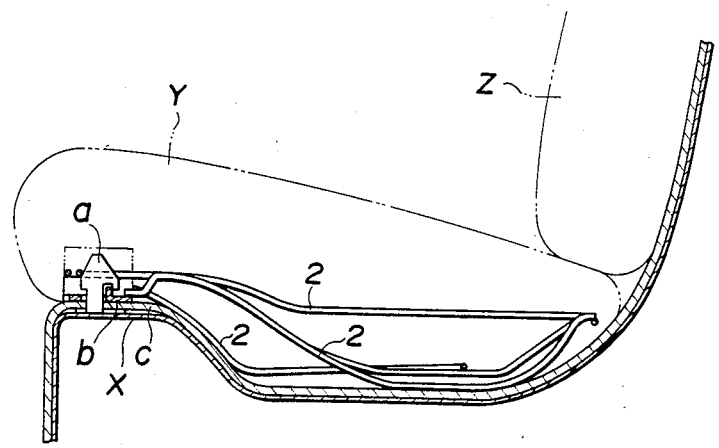
FIG. 2 to FIG. 5 show one embodiment of a mounting structure according to the present invention.

Furthermore, the back portion of the seat Y is secured by means of a seat back Z. (FIG. 2).

A mounting structure of a seat for vehicles according to the present invention, comprises the standing holder secured onto a car floor, the latch member secured to the base of a seat for inserting said holder and the cushioning material laid on the car floor for giving elasticity to said latch member upward, said holder being consisted of the man body folded in the shape of an angle in the direction of a car width, the inserting portion notched in the horizontal direction at a lower end at one side in the back and force directions of the seat and the latch portion notched upward from the front end of said inserting portion and said latch member consists of the inserting hole for inserting the holder and the stopper in the shape of a hook formed along one edge of said inserting hole which engages with the inserting portion of said holder and the latching portion thereof. Accordingly, said stopper inserted into the latching portion from the inserting portion of the holder and engaged therewith is always given elasticity by means of the cushioning material so that the engagement state thereof may be maintained. Furthermore, since the stopper is formed in the shape of a hook, there is no fear that the engagement state will not be released owing to the load applied to the seat in the back and force directions. Therefore, the seat can be easily mounted to a car body and moreover there is no fear of being taken off therefrom.

What we claimed is:

1. A mounting structure of a seat for vehicles which comprises a standing holder secured onto a car floor, a latch member secured to the base of a seat for inserting said holder, a cushioning material laid on the car floor for giving elasticity to said latch member upward, said holder including a main body folded in the shape of an angle in the direction of a car width, an inserting portion notched in the horizontal direction at a lower end of the holder at one side in the fore and aft direction of the seat which terminates in an upwardly notched latch portion and said latch member including an inserting hole for inserting the holder and a stopper in the shape of a hook formed along one edge of said inserting hole which engages with the inserting portion of said holder and the latch portion thereof whereby the cushioning material biases the stopper of the latch member into the latch portion of the holder.

2. The mounting structure of a seat for vehicles according to claim 1, wherein the cushioning material laid on the car floor is laid on a lower portion of the latch member.

3. The mounting structure of a seat for vehicles according to claim 2, wherein said stopper in the shape of a hook is formed by an upwardly folded portion and the height of the folded portion thereof is formed higher than the space between the front end of the inserting portion of said holder and the top face of the cushioning material.

* * * * *